United States Patent

Bura

[15] 3,644,979

[45] Feb. 29, 1972

[54] DEVICE FOR FITTING CONDUCTOR PLATES

[72] Inventor: Ernst Bura, Bickenbach, Germany

[73] Assignee: Fernseh GmbH, Am Alten Bahnhof, Germany

[22] Filed: Mar. 27, 1970

[21] Appl. No.: 23,325

[30] Foreign Application Priority Data

Apr. 3, 1969 Germany.........................G 69 13 559

[52] U.S. Cl...........................................................29/203 B
[51] Int. Cl.........................................................H05k 13/04
[58] Field of Search...............................29/203, 203 B, 203 J

[56] References Cited

UNITED STATES PATENTS 3,395,439 8/1968 Palesi et al. ..........................29/203 B

*Primary Examiner*—Thomas H. Eager
*Attorney*—Ernest F. Marmorek

[57] ABSTRACT

A device for fitting electrical components upon conductor plates comprising a frame for accommodating the plates and a cover capable of being closed upon the frame, the inner side of the cover being provided with a layer of foam material which with a membrane also on the cover forms an adjustable air cushion which can be varied by pumping air into it to accommodate electrical components of varying height.

5 Claims, 2 Drawing Figures

Patented Feb. 29, 1972

3,644,979

Inventor:
Ernst Burd
by
His Attorney.

DEVICE FOR FITTING CONDUCTOR PLATES

FIELD OF THE INVENTION

The invention relates to a device for fitting conductor plates with electrical components comprising a frame for accommodating the conductor plates and a lid closable onto said frame.

BACKGROUND OF THE INVENTION

For the fitting of electrical components to conductor plates a device has already come into practical use, in particular for small scale production, comprising a frame for accommodating the conductor plates, onto which is closed a lid having a soft inner surface, said lid serving to retain the components in position after the wires for the electrical components have been introduced into the holes provided in the conductor plates. Thereafter the conductor plates can be rotated through 180° in order that the ends of the wires for the components may be shortened and bent, that is to say in preparation for the operation of dip soldering, without the risk of the components falling out of the conductor plates.

This known device has the disadvantage that the specially fitted mat of foam material provided on the inner face of the cover can only retain in position electrical components of a particular structural height. Conductor plates having electrical components of various structural heights cannot therefore be fitted by means of this device. Moreover for each particular structural height it is necessary to install a separate mat of suitable thickness.

SUMMARY OF THE INVENTION

It is, therefore, an object of the present invention to provide an improved fitting device which is capable of accommodating electrical components having varying width and height.

The device according to the present invention avoids the mentioned disadvantages by reason of the fact that the inner face of the cover which is turned towards the conductor plate carries, in a known manner, a layer of foam material, and that between the layer of foam material and the outer side of the cover there is provided an adjustable air cushion. Preferably, the air cushion in the cover is closed by means of a rubber membrane at the side thereof adjacent the layer of foam material.

In order that the air cushion may be adjusted according to the structural height of the components, air admission and discharge means with valves are provided at the outer side of the cover. Preferably an air pump is fitted for this purpose at the outer side of the cover.

It is furthermore advantageous if the frame for accommodating the conductor plates is provided with a plurality of adjustable supports for supporting conductor plates of various sizes.

In order that the rear side of the conductor plates shall be as easily accessible as possible to the person who is working on this device, the frame together with the cover is arranged to be displaceable by means of two guides, and is arranged to be pivotable about the same axis upon which the cover is closed onto the frame.

BRIEF DESCRIPTION OF THE DRAWING

The invention will now be explained in more detail with reference to a practical embodiment represented in FIGS. 1 and 2 of the accompanying drawing, wherein only the essential parts are indicated which are necessary for an understanding of the invention. In both of the figures equivalent parts are indicated by the same reference characters.

DESCRIPTION OF A PREFERRED EMBODIMENT

Figure 1:
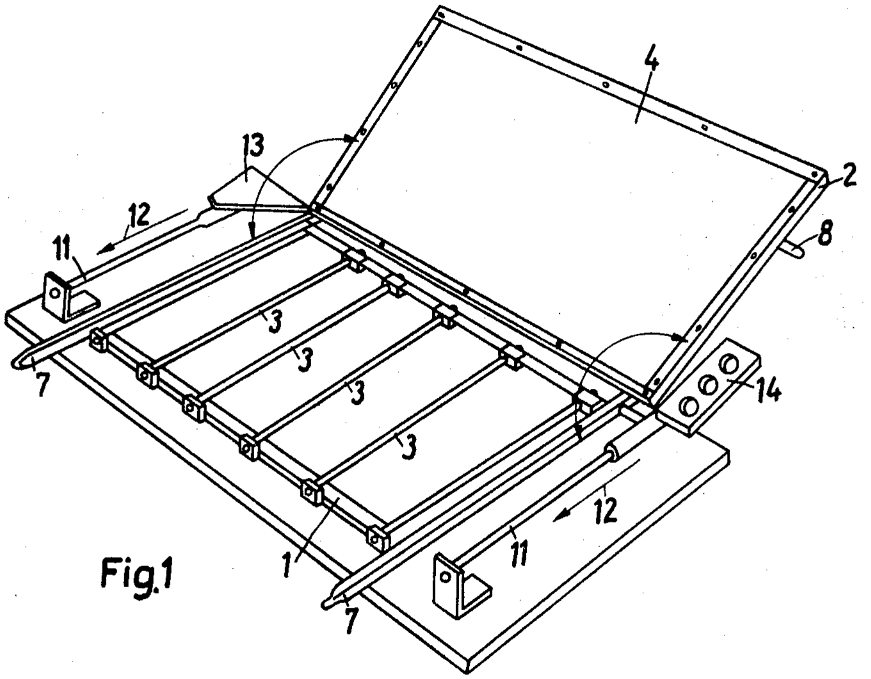
Figure 2:
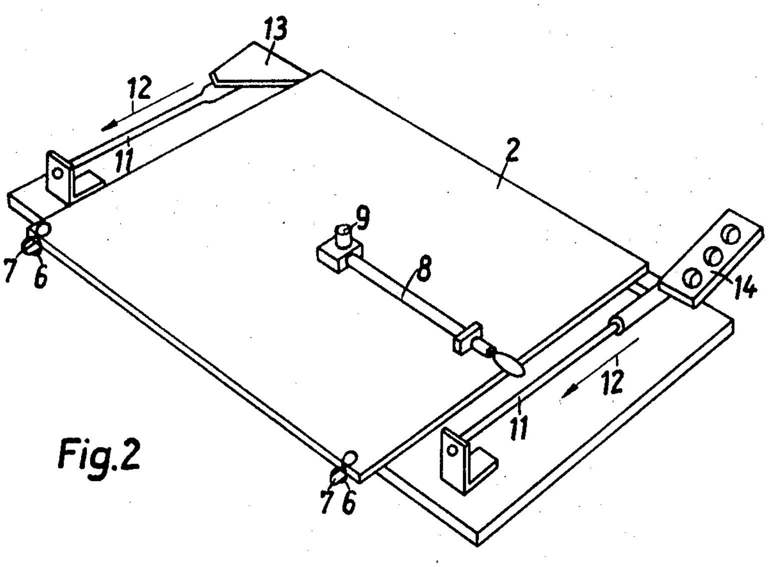

With reference to FIGS. 1 and 2, it is seen that

FIG. 1 shows the device according to the improvement in the opened condition, and FIG. 2 shows the device according to the improvement in the closed condition.

The fitting device according to the present invention comprises a frame 1 for the purpose of accommodating conductor plates which are to be fitted with electrical components, and a cover 2 which can be folded down onto the frame. Upon the frame 1 there are arranged adjustable supports 3 for accommodating conductor plates of varying dimensions. The inner side of the cover 2 is provided with a layer of foam material 4. Between this layer 4 and the outer side of the cover there is provided an adjustable air cushion, which is closed off behind the layer 4 by means of a rubber membrane.

After the electrical components have been fitted to the conductor plates, the cover 2 is closed down onto the frame 1 which carries the conductor plates, as shown in FIG. 2, and is locked in this position by means of a locking device 6 provided upon bars 7. In order that it may be possible to adjust the air cushion in accordance with the structural height of the components, an air pump 8 for supplying air, together with an air release valve 9 are provided upon the outer side of the cover. After the locking has been effected, the frame 1 and the cover 2 are swung upwardly to occupy the same position as the cover 2 in FIG. 1 so as to render visible the underside of the conductor plates with the projecting ends of the wires. In order to achieve more convenient working, the frame 1 and the cover 2 can be displaced in the direction of the arrow 12 upon the guide rods 11. Furthermore a supply container 13 and a tool holder 14 are provided.

Although the foregoing description has been limited to a particular embodiment of the invention, it will be obvious to those skilled in the art that changes and modifications may be had without departing from the invention, and therefore it is intended by the appended claims to cover all such changes and modifications that fall within the true spirit and scope of the invention.

I claim:

1. A device for fitting electrical components upon conductor plates comprising a frame for accommodating the conductor plates and a cover capable of being closed thereon, said cover having an inner side turned towards the conductor plates, and being provided with a layer of foam material, and means for forming an adjustable air cushion between said layer of foam material and the outer side of said cover.

2. A device as claimed in claim 1, wherein said air-cushion-forming means comprises a rubber membrane at the side adjacent said layer of foam material.

3. A device as claimed in claim 2, wherein at an outer side of said cover there are provided an air inlet and exhaust means and valve means for controlling said inlet and exhaust means.

4. A device as claimed in claim 1, wherein said frame for accommodating the conductor plates is provided with a plurality of adjustable support means for accommodating conductor plates of varying size.

5. A device as claimed in claim 1, wherein said frame together with said cover is adjustably arranged upon a pair of guide means for pivotable movement about an axis coinciding with the axis of rotation of said cover when being closed onto said frame.

* * * * *